US009776331B2

United States Patent
Yu et al.

(10) Patent No.: US 9,776,331 B2
(45) Date of Patent: Oct. 3, 2017

(54) METHOD FOR SETTING IDENTIFICATION CODE OF SMART MOTOR AND MULTI-AXIS CONTROL APPARATUS USING THE SAME

(71) Applicants: Kinpo Electronics, Inc., New Taipei (TW); Cal-Comp Electronics & Communications Company Limited, New Taipei (TW)

(72) Inventors: Wei-Shun Yu, New Taipei (TW); Chi-Chang Tung, New Taipei (TW); Jing-Yi Chen, New Taipei (TW); Ting-Shuo Chen, New Taipei (TW)

(73) Assignees: Kinpo Electronics, Inc., New Taipei (TW); Cal-Comp Electronics & Communications Company Limited, New Taipei (TW)

(*) Notice: Subject to any disclaimer, the term of this patent is extended or adjusted under 35 U.S.C. 154(b) by 154 days.

(21) Appl. No.: 14/983,471

(22) Filed: Dec. 29, 2015

(65) Prior Publication Data

US 2017/0080568 A1    Mar. 23, 2017

(30) Foreign Application Priority Data

Sep. 23, 2015  (TW) .............................. 104131461 A

(51) Int. Cl.
*H02P 5/68* (2006.01)
*B25J 9/16* (2006.01)

(52) U.S. Cl.
CPC ............ *B25J 9/1692* (2013.01); *H02P 5/68* (2013.01); *Y10S 901/02* (2013.01)

(58) Field of Classification Search
CPC .......... B25J 9/1692; H02P 5/68; Y10S 901/02
(Continued)

(56) References Cited

U.S. PATENT DOCUMENTS

| 5,499,374 A | 3/1996 | Di Giulio et al. |
| 2005/0001578 A1* | 1/2005 | Sunaga ............... B60H 1/00835 318/625 |
| 2005/0115256 A1* | 6/2005 | Okano ................... F04D 27/004 62/183 |

FOREIGN PATENT DOCUMENTS

| CN | 204471369 | 7/2015 |
| JP | 2000304505 | 11/2000 |
| JP | 2004318439 | 11/2004 |

OTHER PUBLICATIONS

Chun-Hung Liu et al.,"Reduced-Cable Smart Motors Using DC Power Line Communication", Proceedings of the 2001 IEEE International Conference on Robotics & Automation, vol. 4, May 21-26, 2001, pp. 3831-3838.

(Continued)

*Primary Examiner* — Kawing Chan
(74) *Attorney, Agent, or Firm* — Jianq Chyun IP Office

(57) ABSTRACT

A method for setting identification code of smart motors and a multi-axis control apparatus using the same are provided. The method suitable for setting identification codes of a plurality of smart motors includes following steps: entering an identification setting mode when the smart motors receive an identification code setting command; detecting a shaft rotation angle of each smart motor under the identification setting mode, so as to determine whether the shaft rotation angle of each smart motor is larger than a setting value; and when one of the smart motors determines its shaft rotation angle is larger than the setting value, setting the identification code of the smart motor from a preset identification code to a first identification code.

14 Claims, 9 Drawing Sheets

(58) Field of Classification Search
USPC .......................................................... 318/560
See application file for complete search history.

(56) References Cited

OTHER PUBLICATIONS

Eric Wade et al.,"One-Wire Smart Motors Communicating over the DC Power Bus-Line with Application to Endless Rotary Joints", Proceedings of the 2002 IEEE International Conference on Robotics & Automation, vol. 3, May 11-15, 2002, pp. 2369-2374.

Sangok Seok et al.,"A Highly Parallelized Control System Platform Architecture using Multicore CPU and FPGA for Multi-DoF Robots",IEEE International Conference on Robotics 8 Automation (ICRA), May 31-Jun. 7, 2014, pp. 5414-5419.

"Search Report of European Counterpart Application," dated Mar. 3, 2017, p. 1-p. 8.

\* cited by examiner

METHOD FOR SETTING IDENTIFICATION CODE OF SMART MOTOR AND MULTI-AXIS CONTROL APPARATUS USING THE SAME

CROSS-REFERENCE TO RELATED APPLICATION

This application claims the priority benefit of Taiwan application serial no. 104131461, filed on Sep. 23, 2015. The entirety of the above-mentioned patent application is hereby incorporated by reference herein and made a part of this specification.

BACKGROUND OF THE INVENTION

Field of the Invention

The invention relates to an addressing technique of a smart motor and an application thereof, and particularly relates to a method for setting identification codes of smart motors and a multi-axis control apparatus using the same.

Description of Related Art

Along with progress of science and technology, applications of automation control become increasingly popular in daily life, especially robots or robot arms produced by using multi-axis control apparatuses. Such multi-axis control system has multiple joint connections, and is allowed to move in a plane or a three-dimensional (3D) space or move in a linear displacement. In view of a structure, the multi-axis control apparatus is composed of a mechanical main body, a controller, a server mechanism and a sensor, and certain specified operations thereof are set by a program according to an operating requirement. For example, in view of an operation of the robot, the robot can be driven by motors to move an arm to perform an operation of opening or closing a clip, and a result is accurately fed back to a programmable logic controller, and an operator may input an operating sequence, such that the robot can repeatedly complete a countless times of a correct and regular operation. Such robot has been successfully applied to industries such as an automobile manufacturing industry, etc. The robot relates a technical field where the automated mechanical devices are most widely used, and in many dangerous industrial tasks such as assembling, painting, welding and high temperature casting, etc., the robot arms can be used to replace a manual work.

When a controller in the multi-axis control apparatus respectively operates a plurality of smart motors, the controller has to learn an identification code of each smart motor in advance in order to correctly send a command to the individual smart motor in the multi-axis control apparatus, so as to complete a specified operation. Moreover, an original identification code of the smart motor after the smart motor is manufactured is generally set to a preset value, so that when the smart motors are assembled or the smart motors in the multi-axis control apparatus are replaced, the identification codes of the smart motors have to be reset, and the original preset value is changed to a correct parameter in the multi-axis control system, and each of the smart motors in the multi-axis control apparatus must have a different identification code in order to be correctly controlled by the controller.

The smart motor provides a command for changing the identification code, and the controller sends a command to change the identification code. Key parameters of the command sent to a bus by the controller include an object receiving the command (represented in a smart motor identification code), a command type (to change the identification code), a parameter to be specified by the command (a new identification code). When the command is executed, the user has to confirm that the number of the object receiving the command on the bus is only one (two smart motors with the same identification code cannot be connected to the same bus), and none other smart motor currently uses the new identification code. In an actual practice, in order to avoid mistakes, only one smart motor is generally connected to the bus for changing the identification code thereof.

However, in the system of the multi-axis control apparatus, the controller connects all of the smart motors through the bus, and each of the smart motors is connected in a parallel manner. When the identification codes of the smart motors are set, the setting operation cannot be implemented in case that all of the smart motors are simultaneously connected to the bus, since if the smart motors in the apparatus have the same identification code, and are connected to the bus through the parallel manner, the smart motors may simultaneously receive a setting command sent by the controller, which may cause a setting error of the identification code. Therefore, before the plurality of smart motors are used in the multi-axis control apparatus, the identification codes of the smart motors have to set one-by-one without repeating, and then the smart motors can be connected to the bus for usage. In other words, in the prior art, setting of the identification code has to be individually performed for each of the smart motors, which causes inconvenience in installation and setting.

SUMMARY OF THE INVENTION

The invention is directed to a multi-axis control apparatus and a method for setting identification codes of smart motors, by which a user is able to set the identification codes in case that the smart motors in the multi-axis control apparatus are simultaneously coupled, so as to improve a usage convenience.

The invention provides a method for setting identification codes of smart motors, which is adapted to set identification codes for a plurality of smart motors. The method includes following steps. An identification code setting mode is entered when the smart motors receive an identification code setting command. A shaft rotation angle of each of the smart motors is detected under the identification code setting mode, so as to determine whether the shaft rotation angle of each of the smart motors is larger than a setting value. When one of the smart motors determines that the shaft rotation angle thereof is larger than the setting value, an identification code of the one of the smart motors is set from a preset identification code to a first identification code.

In an embodiment of the invention, the method for setting identification codes of smart motors further includes following steps. The one of the smart motors sends a setting indication signal including the first identification code. The setting indication signal is broadcasted to the other smart motors through a bus. When the other smart motors receive the setting indication signal, the first identification code occupied by the one of the smart motors is recorded.

In an embodiment of the invention, the method for setting identification codes of smart motors further includes a following step. When another one of the smart motors determines that the shaft rotation angle thereof is larger than the setting value, an identification code of the another one of the smart motors is set to a second identification code that is not occupied.

In an embodiment of the invention, the step of setting the identification code of the another one of the smart motors to the second identification code that is not occupied includes following steps. The identification code of the another one of the smart motors is set from the preset identification code to the first identification code according to the setting indication signal. When the another one of the smart motors determines that the shaft rotation angle thereof is larger than the setting value, the identification code of the another one of the smart motors is set from the first identification code to the second identification code, where the second identification code is the first identification code plus a unit preset value.

In an embodiment of the invention, the method for setting identification codes of smart motors further includes a following step. When the smart motors enter the identification code setting mode, the identification code of each of the smart motors is reset to the preset identification code.

The invention provides a multi-axis control apparatus including a plurality of smart motors and a main controller. The smart motors respectively have a preset identification code. The main controller is used for providing a plurality of control commands to respectively control rotation of the smart motors, where the main controller is configured to send an identification code setting command to set identification codes of the smart motors, and the smart motors enter an identification code setting mode after receiving the identification code setting command. The smart motors respectively detect a shaft rotation angle thereof under the identification code setting mode, and respectively determine whether the respective shaft rotation angle is larger than a setting value. When one of the smart motors determines that the shaft rotation angle thereof is larger than the setting value, the one of the smart motors sets an identification code thereof from a preset identification code to a first identification code.

In an embodiment of the invention, the multi-axis control apparatus further includes a bus. The bus is coupled to the smart motors and the main controller, and serves as a communication interface between the smart motors and between the smart motors and the main controller.

In an embodiment of the invention, under the identification setting mode, the one of the smart motors sends a setting indication signal including the first identification code, and the setting indication signal is broadcasted to the other smart motors through the bus. The other smart motors record the first identification code occupied by the one of the smart motors according to the received setting indication signal.

In an embodiment of the invention, when another one of the smart motors determines that the shaft rotation angle thereof is larger than the setting value, the another one of the smart motors sets an identification code thereof to a second identification code that is not occupied.

In an embodiment of the invention, when the another one of the smart motors receives the setting indication signal, the another one of the smart motors sets an identification code thereof from the preset identification code to the first identification code according to the setting indication signal, and when the another one of the smart motors determines that the shaft rotation angle thereof is larger than the setting value, the another one of the smart motors sets the identification code thereof from the first identification code to the second identification code, where the second identification code is the first identification code plus a unit preset value.

In an embodiment of the invention, the bus includes a power line, a ground line and a signal line. The power line is coupled to the main controller and a power port of each of the smart motors. The ground line is coupled to the main controller and a ground port of each of the smart motors. The signal line is coupled to the main controller and a data transmitting port of each of the smart motors. When each of the smart motors transmits a signal to each other, each of the smart motors sends the signal to the other smart motors through the signal line in a broadcasting manner.

In an embodiment of the invention, the bus includes a power line, a ground line, a signal receiving line and a signal transmitting line. The power line is coupled to the main controller and a power port of each of the smart motors. The ground line is coupled to the main controller and a ground port of each of the smart motors. The signal receiving line is coupled to a data transmitting port of the main controller and a signal receiving port of each of the smart motors. The signal transmitting line is coupled to a data receiving port of the main controller and a signal transmitting port of each of the smart motors. When each of the smart motors transmits a signal to each other, each of the smart motors sends the signal to the main controller through the signal transmitting line, and the controller transmits the signal to the other smart motors through the signal receiving line in a broadcasting manner.

In an embodiment of the invention, each of the smart motors includes a gear set, a motor body, a position sensor and a motor controller. The motor body has a shaft, where the shaft is coupled to the gear set to drive the gear set to rotate. The position sensor is coupled to the gear set and the motor body, and is configured to detect a rotation angle of the gear set to generate a shaft detection signal. The motor controller is coupled to the motor body and the position sensor, and is configured to communicate with the main controller to control an operation of the motor body, where the motor controller further calculates the shaft rotation angle according to the shaft detection signal.

In an embodiment of the invention, the position sensor includes a variable resistor and a voltage detection unit. A first terminal of the variable resistor is coupled to a reference voltage, a second terminal of the variable resistor is coupled to a ground port, and an adjusting terminal of the variable resistor is coupled to the shaft, where an equivalent resistance value of the variable resistor is varied along with the rotation of the shaft. The voltage detection unit is coupled to the variable resistor, and is configured to detect a voltage value between the first terminal and the adjusting terminal of the variable resistor, and takes the detected voltage value as the shaft detection signal for providing to the motor controller.

According to the above descriptions, the embodiment of the invention provides a method for setting identification codes of smart motors and a multi-axis control apparatus using the same. According to the aforementioned method, the user may sequentially rotate the shafts of the smart motors by exerting an external force, so as to set the identification codes of the smart motors one-by-one. Since each of the smart motors detects a variation of the shaft rotation angle thereof to serve as a reference for determining whether to update the identification code, when the identification codes of the smart motors are set, the user may perform the setting operation under a configuration that all of the smart motors are connected to the bus, and it is unnecessary to worry that the smart motors in the apparatus have the same identification code to cause a setting error of the identification codes. Therefore, the convenience for setting the multi-axis control apparatus is greatly improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
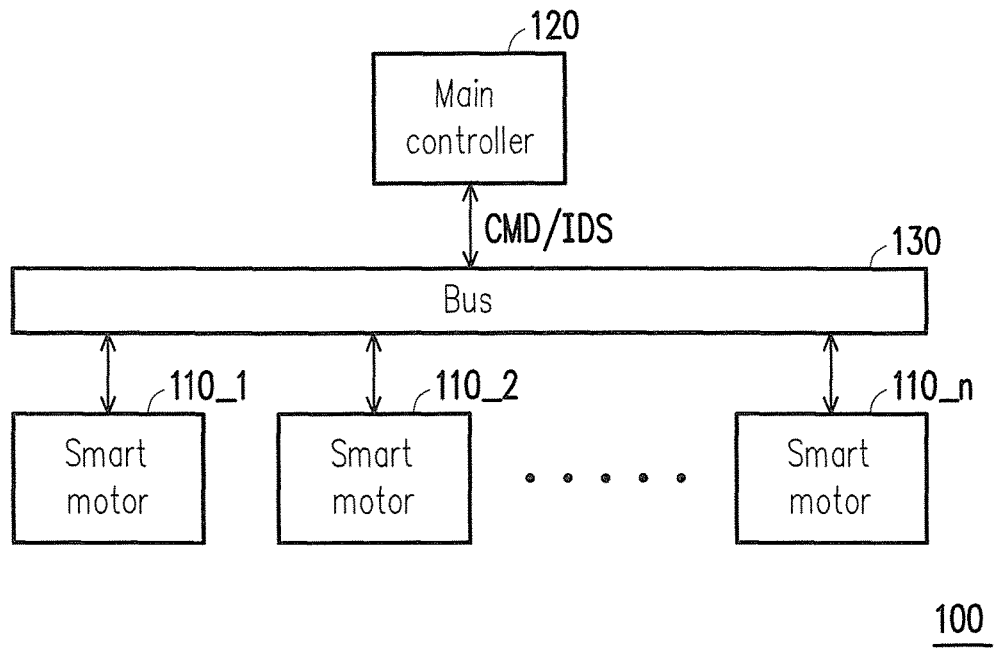
FIG. 1A is a structural schematic diagram of a multi-axis control apparatus according to an embodiment of the invention.

In order to facilitate a user of a multi-axis control apparatus to simply install and set smart motors and save a time for resetting identification codes required when the smart motors are replaced, the embodiments of the invention provides a multi-axis control apparatus and a method for setting identification codes. Embodiments of the invention are described in detail below, and detailed implementations of the embodiments can be suitably adjusted by those skilled in the art. Wherever possible, the same reference numbers are used in the drawings and the description to refer to the same or like parts.

Figure 1B:
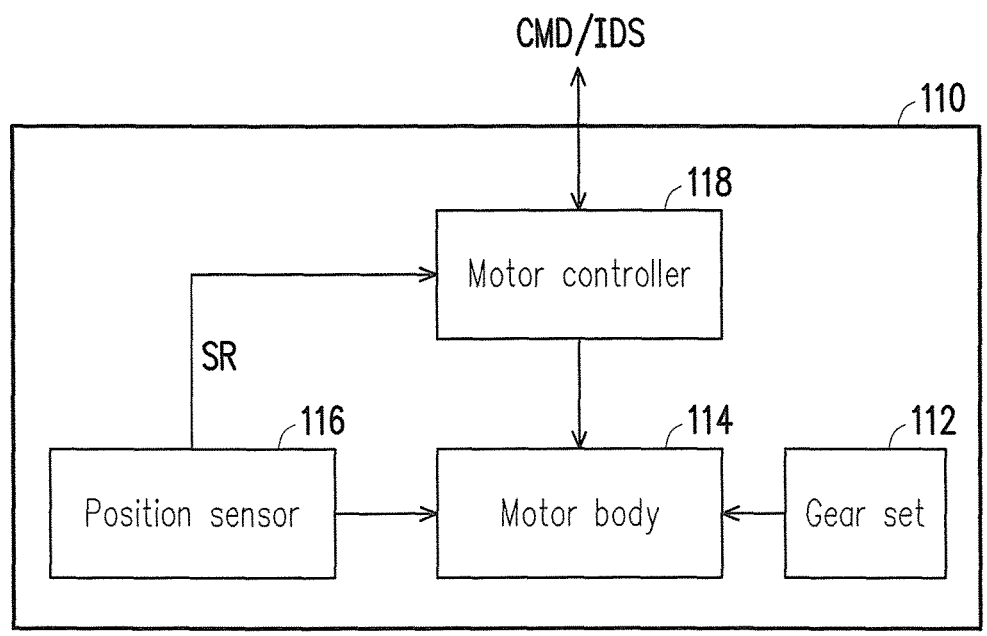
FIG. 1B is a structural schematic diagram of a smart motor according to an embodiment of the invention.

FIG. 1A is a structural schematic diagram of a multi-axis control apparatus according to an embodiment of the invention. FIG. 1B is a structural schematic diagram of a smart motor according to an embodiment of the invention.

Referring to FIG. 1A, the multi-axis control apparatus 100 of the present embodiment is, for example, a robot, a robot arm or a mechanical control platform, which includes smart motors 110_1-110_n, a main controller 120 and a bus 130. The number of the smart motors 110_1-110_n can be varied along with a design requirement of the multi-axis control apparatus 100 (i.e., n is a value defined by a designer and is a positive integer greater than 1).

In the present embodiment, each of the smart motors 110_1-110_n may correspond to a different controlled object (not shown), each of the controlled objects may move along the same or different shaft directions in response to rotations of the smart motors 110_1-110_n.

The main controller 120 can be used for providing a plurality of control commands CMD to respectively control the rotations of the smart motors 110_1-110_n, and the main controller 120 is configured to send an identification code setting command IDS to set identification codes of the smart motors 110_1-110_n. In the present embodiment, the main controller 120 is, for example, implemented by a physical logic operation circuit such as a processor or a control chip, etc., and a hardware implementation pattern of the main controller 120 is not limited by the invention.

The bus 130 is coupled between the smart motors 110_1-110_n and the main controller 120, which may serve as a communication interface between the smart motors 110_1-110_n and a communication interface between the smart motors 110_1-110_n and the main controller 120. In other words, the smart motors 110_1-110_n may send signals to the other smart motors 110_1-110_n and/or the main controller 120 through the bus 130, or receive signals from the other smart motors 110_1-110_n and/or the main controller 120, and the main controller 120 is the same as above.

A structure of each of the smart motors 110_1-110_n is shown as the smart motor 110 of FIG. 1B. Referring to FIG. 1A and FIG. 1B, the smart motor 110 of the present embodiment includes a gear set 112, a motor body 114, a position sensor 116 and a motor controller 118.

In the present embodiment, the motor body 114 is, for example, a general direct current (DC) step motor or a DC server motor, which has a stator, a rotor and a shaft (not shown), and the motor body 114 is controlled by a driving signal provided by the motor controller 118 to make the shaft to rotate along with the rotor. The shaft is coupled to the gear set 112, and drives the gear set 112 to rotate when the motor body 114 operates, such that the controlled object (not shown) connected to the gear set 112 may move along a specific axial direction along with the rotation of the gear set 112.

The position sensor 116 is coupled to the gear set 112 and the motor body 114, and is configured to detect a rotation angle of the gear set 112 to generate a shaft detection signal SR.

The motor controller 118 is coupled to the motor body 114 and the position sensor 116. The motor controller 118 is configured to communicate with the main controller 120 to control the operation of the motor body 114. For example, the motor controller 118 may receive the control command CMD and the identification code setting command IDS sent by the main controller 120 through the bus 130, and generates the corresponding driving signal according to the control command CMD to control the operation of the motor body 114, and enters an identification code setting mode according to the identification code setting command IDS to execute a related identification code setting operation. For another example, the motor controller 118 of each of the smart motors 110_1-110_n may communicate with each other through the bus 130, so as to provide an operation state or identification code setting information of itself to the motor controllers 118 of the other smart motors 110_1-110_n for recording.

Figure 2:
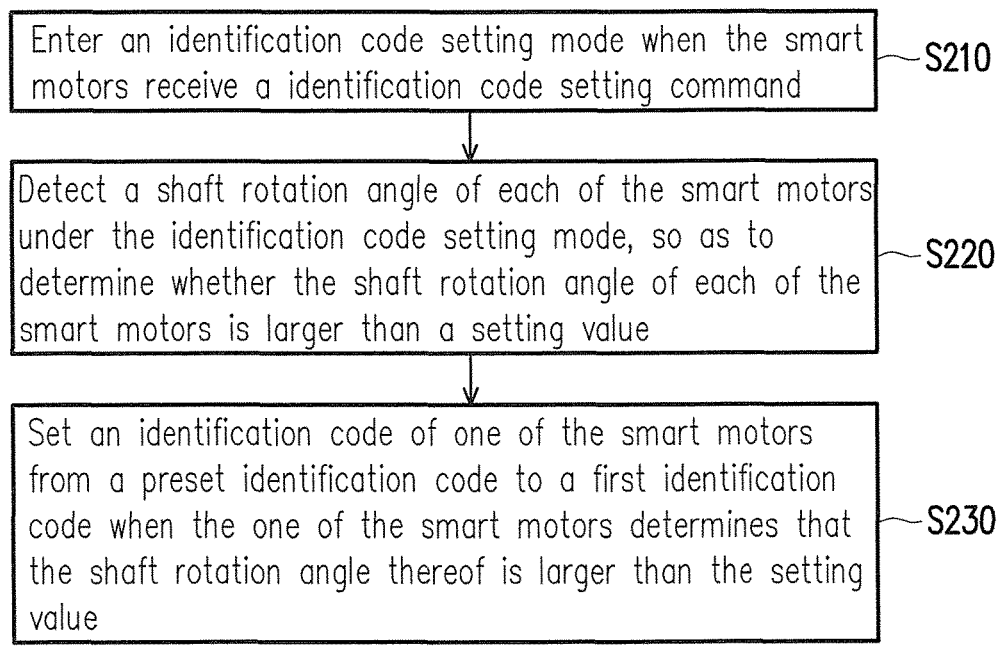
FIG. 2 is a step flowchart illustrating a method for setting identification codes of smart motors according to an embodiment of the invention.

A method for setting identification codes of the smart motors is described below with reference of a step flow of FIG. 2. Referring to FIG. 1A, FIG. 1B and FIG. 2, in the present embodiment, the smart motors 110_1-110_n enter an identification code setting mode after receiving the identification code setting command IDS (step S210).

Each of the smart motors 110_1-110_n detects a shaft rotation angle thereof under the identification code setting mode, and determines whether the shaft rotation angle is larger than a preset setting value (which is, for example, 45 degrees, though the invention is not limited thereto) (step S220). In an exemplary embodiment of the invention, each of the smart motors 110_1-110_n may calculate a variation amount of the shaft detecting signal SR generated by the position sensor 116 within a preset period by using the motor controller 118, and takes the same as a signal indicating the shaft rotation angle, and compares the calculated signal with the preset value to determine whether the shaft rotation angle is larger than the preset value. In other words, in the present embodiment, the motor controller 118 of each of the smart motors 110_1-110_n may calculate the shaft rotation angel according to the shaft detection signal SR.

Then, when one of the smart motors 110_1-110_n determines that the shaft rotation angle thereof is larger than the setting value, taking the smart motor 110_1 as an example, the smart motor 110_1 may set an identification code thereof from a preset identification code to a corresponding identification code (step S230), so as to complete setting the identification code of one smart motor.

The aforementioned flow of setting the identification codes is further described below with reference of the setting operation of the user. When the user wants to set the identification codes of the smart motors 110_1-110_n, the user may first send the identification code setting command IDS through the main controller 120. The identification code setting command IDS is broadcasted to all of the smart motors 110_1-110_n on the bus 130 through the bus 130, such that the smart motors 110_1-110_n enters the identification code setting mode.

Under the identification code setting mode, the user may rotate the shafts of the smart motors 110_1-110_n by exerting an external force, such that the shaft rotation angles detected by the smart motors 110_1-110_n are varied. When the user exerts the external force to make the variations of the shaft rotation angles to be larger than the preset value, the motor controller 110 of the rotated smart motors 110_1-110_n determines that the user is performing the identification code setting operation on itself in response to the variation of the shaft rotation angle, and sets the identification code of itself from the preset identification code to a specific identification code.

According to the above method for setting the identification codes, the user may sequentially rotate the smart motors 110_1-110_n intending to set the identification codes by exerting the external force, and after the smart motors 110_1-110_n are sequentially rotated, and the identification codes thereof are updated, the identification code setting operation of the smart motors 110_1-110_n is completed. In the multi-axis control apparatus 100 completing the identification code setting operation, the smart motors 110_1-110_n respectively have different identification codes, and the main controller 110 may take the identification codes of the smart motors 110_1-110_n as indexes to generate the corresponding control commands CMD, such that the main controller 110 may respectively control the smart motors 110_1-110_n.

To be specific, based on the identification code setting method of the invention, when the identification codes of the smart motors 110_1-110_n are set, the user is unnecessary to one-by-one connect the smart motors 110_1-110_n to the bus 130 for testing, but may directly connect the smart motors 110_1-110_n of the multi-axis control apparatus 100 to the bus 130 simultaneously, and exerts the external force to rotate the shafts of the smart motors 110_1-110_n such that the smart motors 110_1-110_n perform the identification code setting operation in response to the external force exerted by the user, so as to improve the convenience for setting the multi-axis control apparatus 100.

Figure 3:
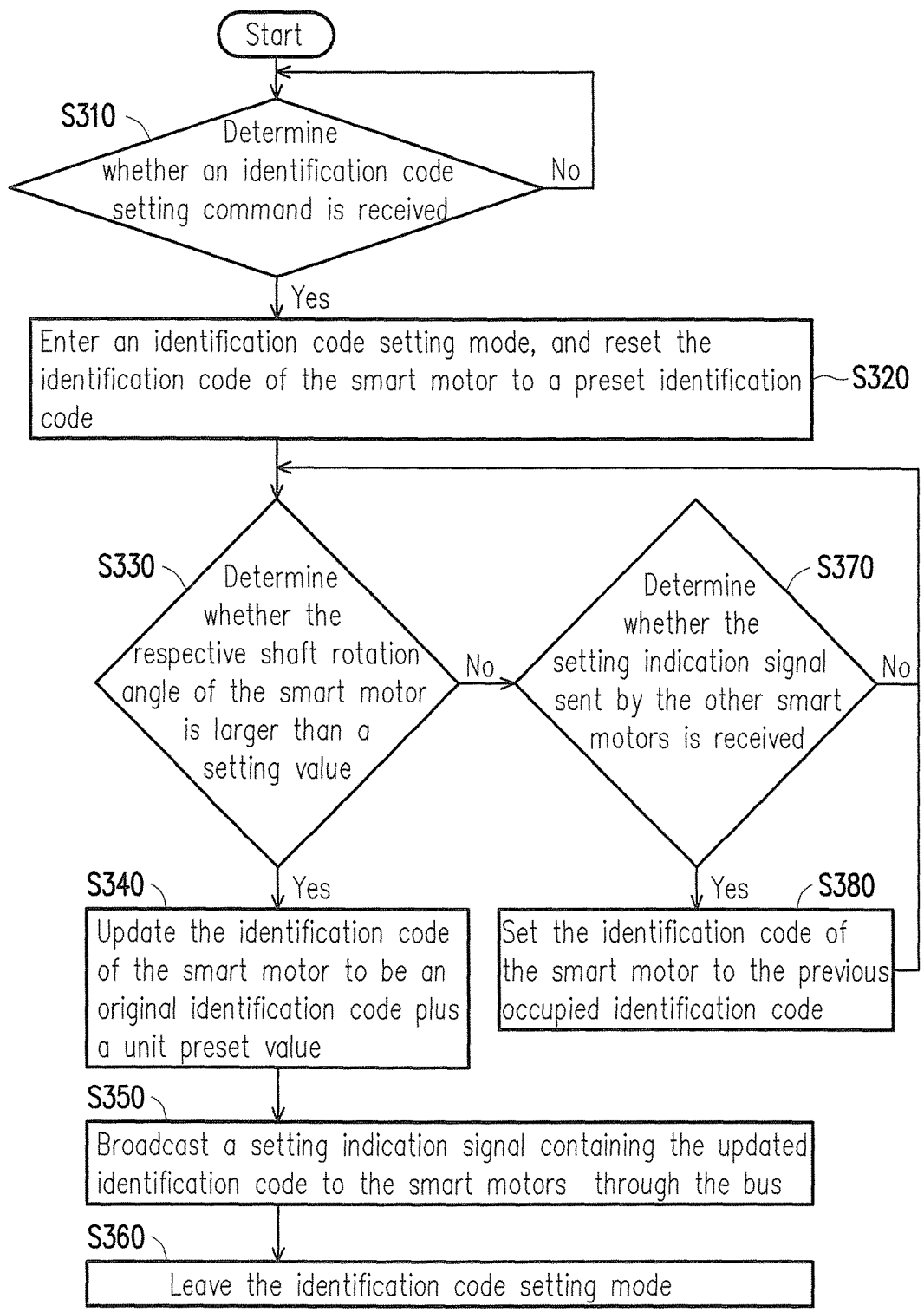
FIG. 3 is a step flowchart illustrating a method for setting identification codes of smart motors according to another embodiment of the invention.

A detailed step flow of the method for setting the identification codes of the invention is described below with reference of FIG. 3 and FIG. 4A to FIG. 4F. FIG. 3 is a step flowchart illustrating a method for setting identification codes of smart motors according to another embodiment of the invention. FIG. 4A to FIG. 4F are schematic diagrams illustrating setting situations of the method for setting identification codes of smart motors of FIG. 3. In the present embodiment, the identification codes setting operation performed to the three smart motors 110_1-110_3 is taken as an example for description, though the invention is not limited thereto.

Figure 4A:
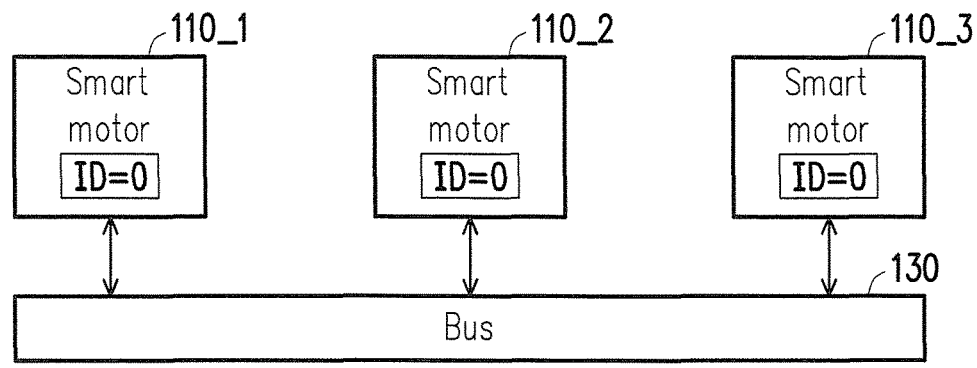
FIG. 4A to FIG. 4F are schematic diagrams illustrating setting situations of the method for setting identification codes of smart motors of FIG. 3.

Referring to FIG. 3 and FIG. 4A, in the step flow of the present embodiment, the smart motors 110_1-110_3 first determine whether an identification code setting command is received (step S310). If not, the detection is continually performed. Conversely, if yes, the smart motors 110_1-110_3 enter an identification code setting mode, and each of the smart motors 110_1-110_3 resets the identification code ID thereof to a preset identification code (step S320). For example, the preset identification code is 0 (indicated as ID=0), though the invention is not limited thereto. Under the identification code setting mode, the smart motors 110_1-110_3 determine whether the respective shaft rotation angle is larger than a setting value (step S330).

Figure 4B:
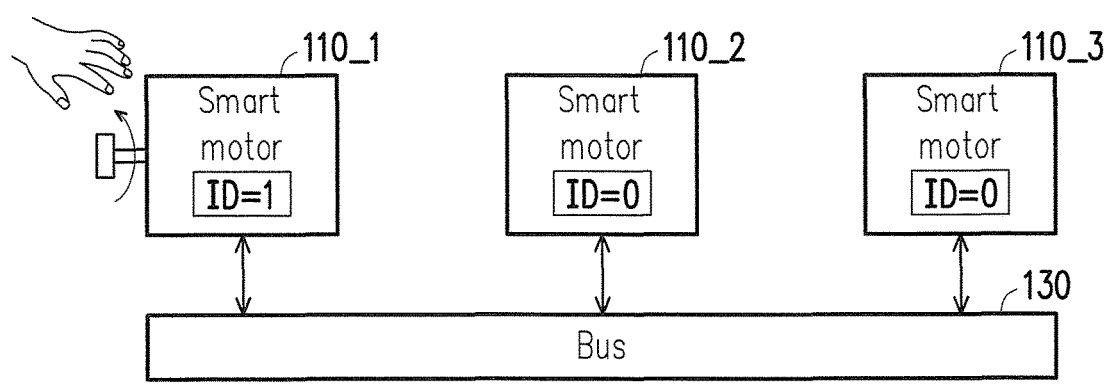

If the user now exerts an external force to rotate the shaft of the smart motor 110_1, as shown in FIG. 4B, the smart motor 110_1 determines that the shaft rotation angle thereof is larger than the setting value, and updates the identification code ID thereof to be the original identification code (0) plus a unit preset value (1) (step S340). In other words, in the step S340, the identification code ID of the smart motor 110_1 is set to 1 (ID=1).

Figure 4C:
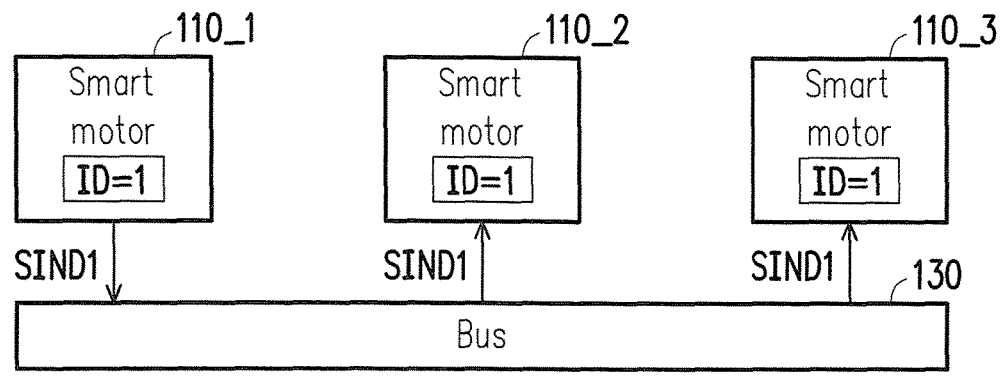

Then, as shown in FIG. 4C, the smart motor 110_1 broadcasts a setting indication signal SIND1 containing the updated identification code (ID=1) to the smart motors 110_2 and 110_3 through the bus 130 (step S350). After the step S350, the smart motor 110_1 is defined to have completed the identification code setting, and leaves the identification code setting mode (step S360).

Moreover, in view of the smart motor 110_2 and 110_3 that are not rotated by the external force of the user, the determination result of the smart motors 110_2 and 110_3 in the step S330 is negative. Now, the smart motors 110_2 and 110_3 further determine whether the setting indication signal SIND1 sent by the other smart motors (which are the smart motors 110_1 and 110_3 in view of the smart motor 110_2, and are the smart motors 110_1 and 110_2 in view of the smart motor 110_3) is received (step S370).

Under the current setting state, the smart motors 110_2 and 110_3 may receive the setting indication signal SIND1 sent by the smart motor 110_1, so that the smart motors 110_2 and 110_3 respectively set the identification codes ID thereof to the previous occupied identification code (1) (step S380). In other words, the smart motors 110_2 and 110_3 now set the identification codes ID thereof to 1 (ID=1). After the step S380, the smart motors 110_2 and 110_3 again execute the step S330 to continually determine whether the shaft rotation angles thereof are greater than the setting value.

Figure 4D:
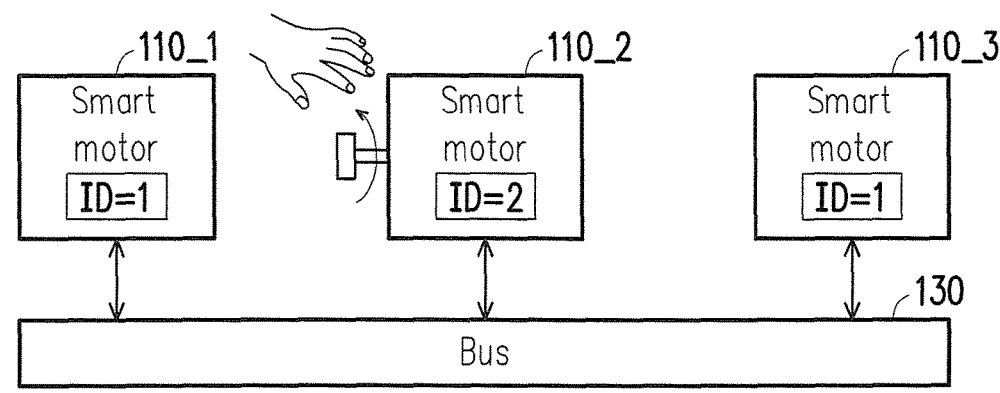

If the user now exerts the external force to rotate the shaft of the smart motor 110_2, as shown in FIG. 4D, the smart motor 110_2 determines that the shaft rotation angle thereof is larger than the setting value, and updates the identification code ID thereof to be the original identification code (1) plus the unit preset value (1) (step S340). In other words, in the step S340 of such stage, the identification code ID of the smart motor 110_2 is set to 2 (ID=2).

Figure 4E:
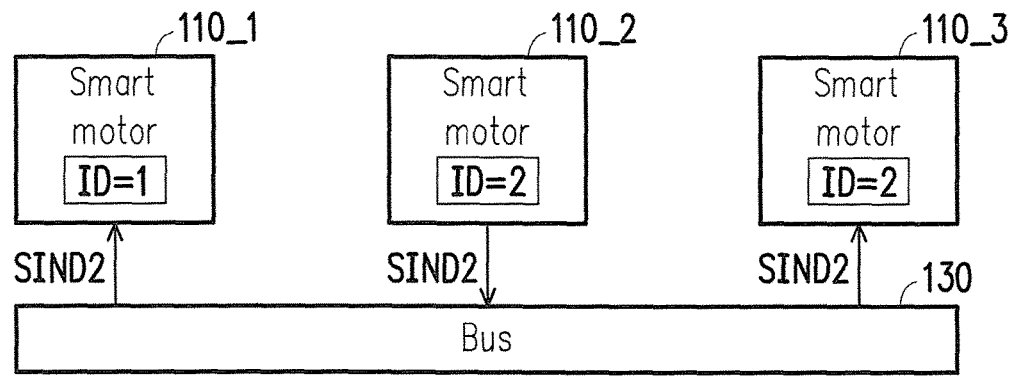

Then, as shown in FIG. 4E, the smart motor 110_2 broadcasts a setting indication signal SIND2 containing the updated identification code (ID=2) to the smart motors 110_1 and 110_3 through the bus 130 (step S350). After the step S350, the smart motor 110_2 is defined to have completed the identification code setting, and leaves the identification code setting mode (step S360).

In view of the smart motor 110_1 and 110_3 that are not rotated by the external force of the user, since setting of the identification code ID of the smart motor 110_1 has been completed, the follow up steps are not performed. The determination result of the smart motor 110_3 in the step S330 is negative. Now, the smart motor 110_3 further determines whether the setting indication signal SIND2 sent by the other smart motors 110_1 and 110_2 is received (step S370).

Under the current setting state, the smart motor 110_3 may receive the setting indication signal SIND2 sent by the smart motor 110_2, so that the smart motor 110_3 sets the identification codes ID thereof to the previous occupied identification code (2) (step S380). In other words, the smart motor 110_3 now sets the identification codes ID thereof to 2 (ID=2). After the step S380, the smart motor 110_3 again executes the step S330 to continually determine whether the shaft rotation angle thereof is greater than the setting value.

Figure 4F:
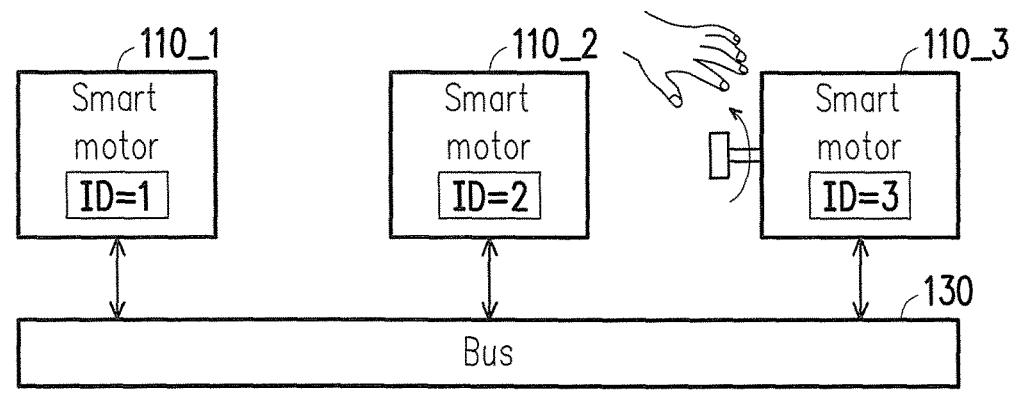

Finally, if the user now exerts the external force to rotate the shaft of the smart motor 110_3, as shown in FIG. 4F, the smart motor 110_3 determines that the shaft rotation angle thereof is larger than the setting value, and updates the identification code ID thereof to be the original identification code (2) plus the unit preset value (1) (step S340), and broadcasts a setting indication signal (step S350) to leave the identification code setting mode (step S360). In other words, in the step S340 of such stage, the identification code ID of the smart motor 110_3 is set to 3 (ID=3). By now, the identification codes ID of all of the smart motors 110_1-110_3 are set.

It should be noted that in order to avoid identification code setting failure caused by inadequate rotation of the smart motors 110_1-110_n driven by the user, in an exemplary embodiment of the invention, a prompt device (not shown) can be set in each of the smart motors 110_1-110_n. After the smart motors 110_1-110_n complete the identification code setting operation, the prompt devices may send a notification to notify the user that the smart motors 110_1-110_n have complete the identification code setting operation. The prompt device is, for example, a prompt lamp, a device capable of sending a prompt sound, or the motor is rotated by a preset angle, etc.

Figure 5:
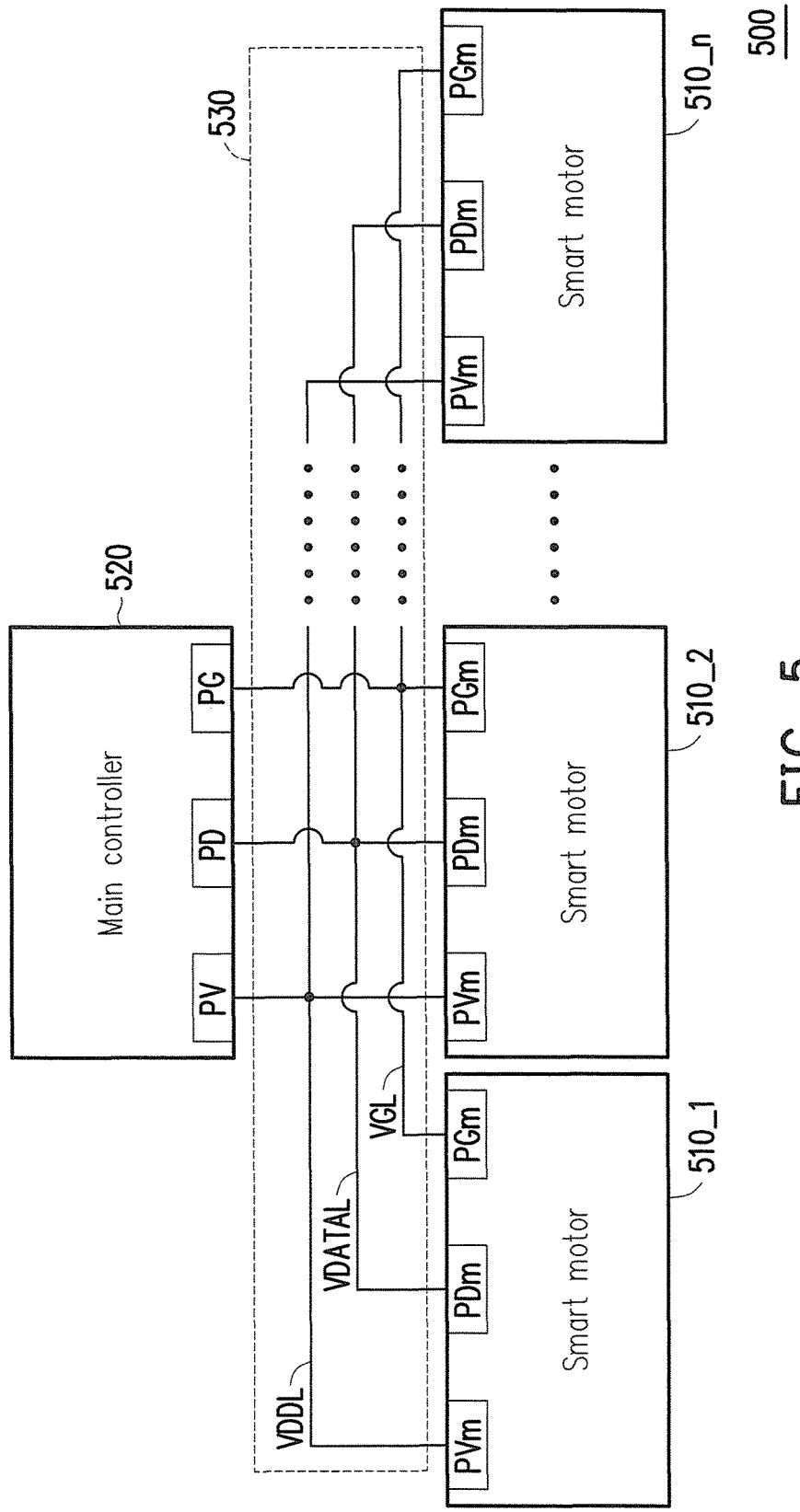
FIG. 5 is a configuration schematic diagram of a multi-axis control apparatus and a bus thereof according to an embodiment of the invention.

FIG. 5 is a configuration schematic diagram of a multi-axis control apparatus and a bus thereof according to an embodiment of the invention. Referring to FIG. 5, the multi-axis control apparatus 500 of the present embodiment includes smart motors 510_1-510_n, a main controller 520 and a bus 530.

In the present embodiment, the smart motors 510_1-510_n respectively have a power port PVm, a ground port PGm and a data transmitting port PDm. The main controller 520 has a corresponding power port PC, a ground port PG and a data transmitting port PD. The bus 530 includes a power line VDDL, a ground line VGL and a signal line VDATAL. The power ports PVm of the smart motors 510_1-510_n are connected to the power line VDDL of the bus 530 in parallel, and are coupled to the power port PV of the main controller 520 through the power line VDDL. Similarly, the ground ports PGm of the smart motors 510_1-510_n are connected to the ground line VGL of the bus 530 in parallel, and are coupled to the ground port PG of the main controller 520 through the ground line VGL. The data transmitting ports PDm of the smart motors 510_1-510_n are connected to the signal line VDATAL of the bus 530 in parallel, and are coupled to the data transmitting port PD of the main controller 520 through the signal line VDATAL.

Under the configuration of the bus 530 of the present embodiment, signal transmission between the smart motors 510_1-510_n and between the smart motors 510_1-510_n and the main controller 520 is implemented through broadcasting. In other words, in the present embodiment, when the smart motor 510_1 wants to transmit the setting indication signal indicating the occupied identification code information to the other smart motors 510_2-510_n, the smart motor 510_1 transmits the signal to the other smart motors 510_2-510_n through the signal line VDATAL in a broadcasting manner.

It should be noted that in the present embodiment, a specific communication protocol can be set between the smart motors 510_1-510_n and the main controller 520, so as to avoid a situation that two or more smart motors 510_1-510_n simultaneously send signals to cause a confliction.

Figure 6:
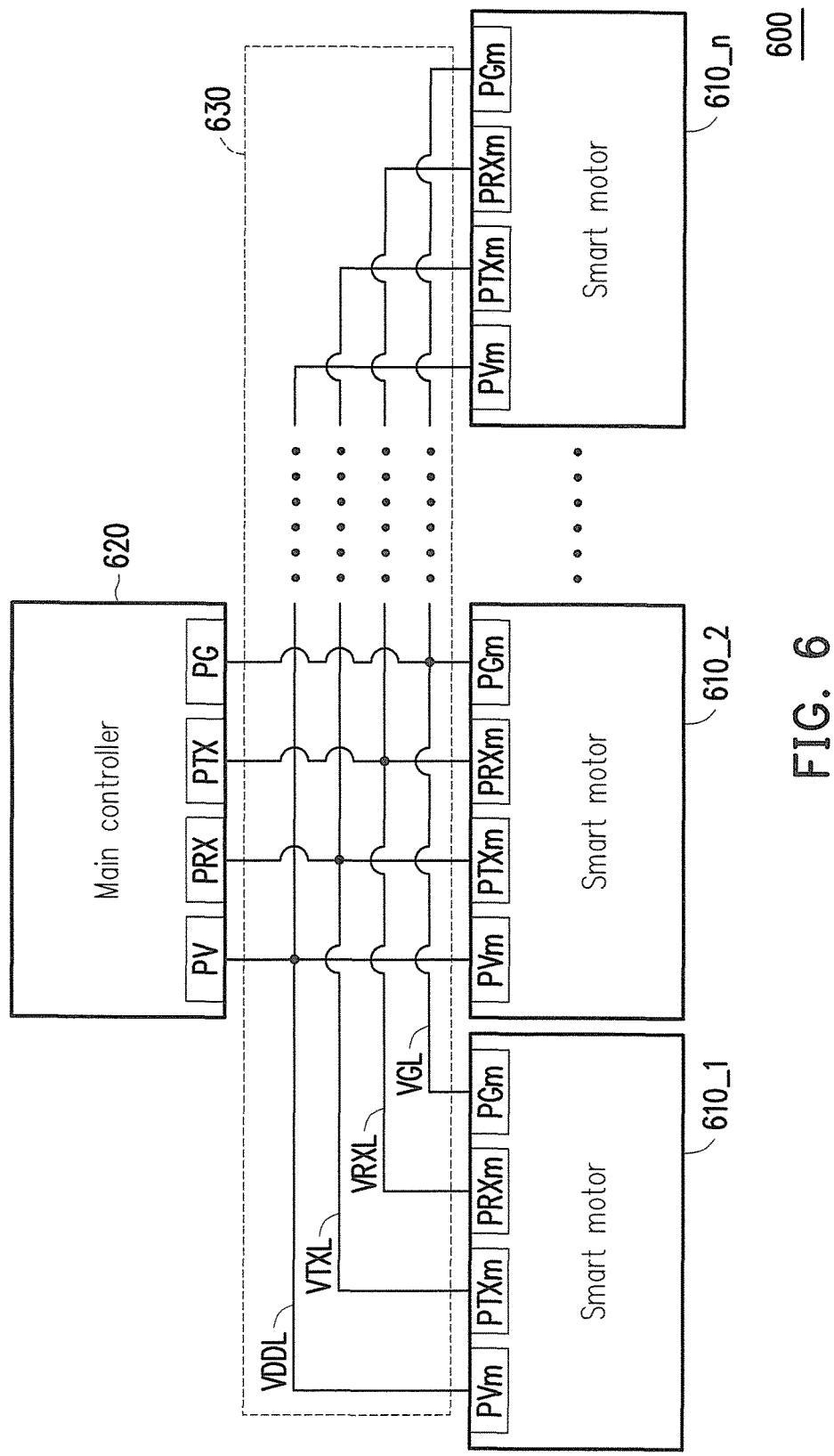
FIG. 6 is a configuration schematic diagram of a multi-axis control apparatus and a bus thereof according to another embodiment of the invention.

FIG. 6 is a configuration schematic diagram of a multi-axis control apparatus and a bus thereof according to another embodiment of the invention. Referring to FIG. 6, the multi-axis control apparatus 600 of the present embodiment includes smart motors 610_1-610_n, a main controller 620 and a bus 630.

In the present embodiment, the smart motors 610_1-610_n respectively have a power port PVm, a ground port PGm, a data transmitting port PTXm and a data receiving port PRXm. The main controller 620 has a corresponding power port PC, a ground port PG, a data transmitting port PTX and a data receiving port PRX. The bus 630 includes a power line VDDL, a ground line VGL, a signal receiving line VRXL and a signal transmitting line VTXL. The power ports PVm of the smart motors 610_1-610_n are connected to the power line VDDL of the bus 630 in parallel, and are coupled to the power port PV of the main controller 620 through the power line VDDL. Similarly, the ground ports PGm of the smart motors 610_1-610_n are connected to the ground line VGL of the bus 630 in parallel, and are coupled to the ground port PG of the main controller 620 through the ground line VGL.

Moreover, the data transmitting ports PTXm of the smart motors 610_1-610_n are connected to the signal transmitting line VTXL of the bus 630 in parallel, and are coupled to the data receiving port PRX of the main controller 620 through the signal transmitting line VTXL. The data receiving ports PRXm of the smart motors 610_1-610_n are connected to the signal receiving line VRXL of the bus 630 in parallel, and are coupled to the data transmitting port PTX of the main controller 620 through the signal receiving line VRXL.

Under the configuration of the bus 630 of the present embodiment, signal transmission between the smart motors 610_1-610_n is implemented through the main controller 620, and signal transmission from the main controller 620 to the smart motors 610_1-610_n is implemented through broadcasting. To be specific, in the present embodiment, when each of the smart motors 610_1-610_n wants to transmit a signal to each other, each of the smart motors 610_1-610_n has to first transmit the signal to the main controller 620 through the signal transmitting line VTXL, and the main controller 620 transmits the signal to the other smart motors 610_1-610_n through the signal receiving line VRXL in the broadcasting manner.

In other words, in the present embodiment, when the smart motor 610_1 wants to transmit the setting indication signal indicating the occupied identification code information to the other smart motors 610_2-610_n, the smart motor 610_1 transmits the setting indication signal to the main controller 620 through the signal transmitting line VTXL, and the main controller 620 transmits the setting indication signal to the other smart motors 610_2-610_n through the signal receiving line VRXL in the broadcasting manner.

Figure 7:
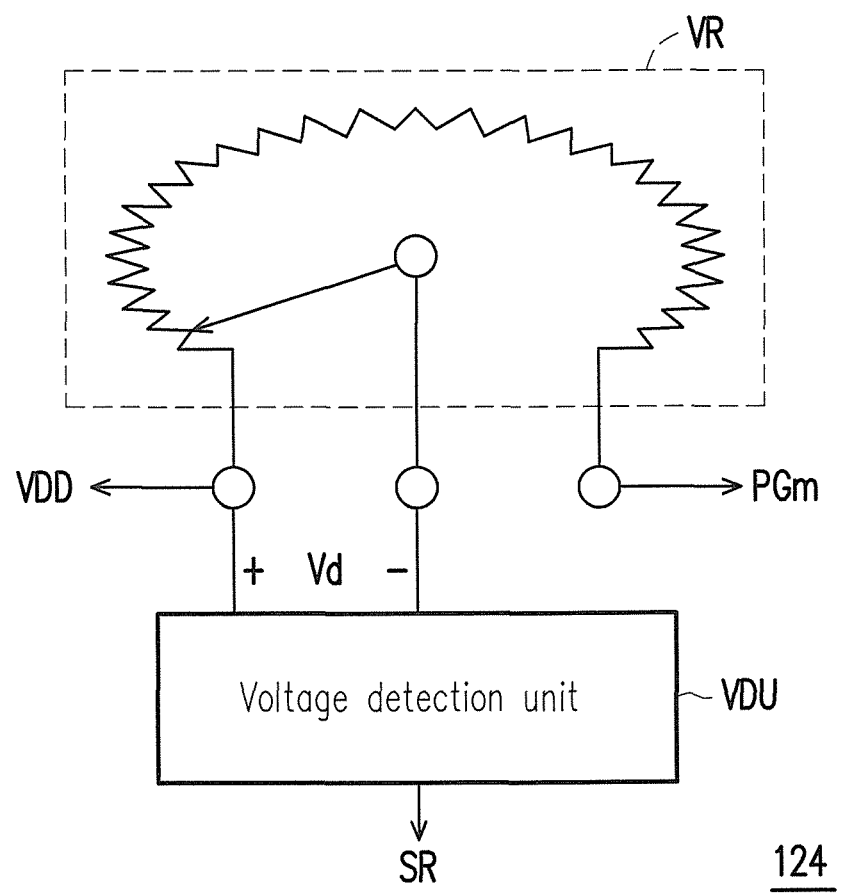
FIG. 7 is a structural schematic diagram of a position sensor according to an embodiment of the invention.

FIG. 7 is a structural schematic diagram of a position sensor according to an embodiment of the invention. The present embodiment provides an example of the position sensor, and the invention is not limited thereto. Referring to FIG. 2 and FIG. 7, the position sensor 116 of the present embodiment includes a variable resistor VR and a voltage detection unit VDU.

The variable resistor VR has a first terminal, a second terminal and an adjusting terminal. The first terminal of the variable resistor VR is coupled to a reference voltage VDD, the second terminal of the variable resistor VR is coupled to the ground port PGm, and the adjusting terminal of the variable resistor VR is coupled to the shaft of the motor body 114. The adjusting terminal may switch a position along with rotation of the shaft, such that an equivalent resistance value of the variable resistor VR is accordingly varied. Namely, the equivalent resistance value of the variable resistor VR is varied along with the rotation of the shaft of the motor body 114.

The voltage detection unit VDU is coupled to the variable resistor VR, and is configured to detect a voltage value Vd between the first terminal and the adjusting terminal of the variable resistor VR, and takes the detected voltage value Vd as the shaft detection signal SR for providing to the motor controller 118.

Practical values are used to further describe the embodiment of FIG. 7. In case that the first terminal of the variable resistor VR is connected to the reference voltage VDD of 5V, and the second terminal of the variable resistor VR is connected to the ground port PGm of 0V, an effective electrical angle of the variable resistor VR is 330 degrees, and if the rotation angle exceeds 45 degrees, the voltage detection unit VDU may measure a voltage variation of more than 5/330*45=0.6818 volts between the first terminal and the adjusting terminal. Therefore, when the motor controller 118 determines that the variation amount of the voltage value Vd exceeds 0.6818, the motor controller 118 determines that the shaft of the motor body 114 is rotated for more than 45 degrees, and executes the operation of setting the identification code.

It should be noted that the aforementioned method of determining the shaft rotation angel by detecting the voltage value variation of the variable resistor is only an example for determining the shaft rotation angle, and in other embodiments, the smart motor may implement detecting the shaft rotation angle by using the position sensor to sense a magnetic field variation occurred when the motor is rotated, which is not limited by the invention.

In summary, the embodiment of the invention provides a method for setting identification codes of smart motors and a multi-axis control apparatus using the same. According to the aforementioned method, the user may sequentially rotate the shafts of the smart motors by exerting an external force, so as to set the identification codes of the smart motors one-by-one. Since each of the smart motors detects a variation of the shaft rotation angle thereof to serve as a reference for determining whether to update the identification code, when the identification codes of the smart motors are set, the user may perform the setting operation under a configuration that all of the smart motors are connected to the bus, and it is unnecessary to worry that the smart motors in the apparatus have the same identification code to cause a setting error of the identification codes. Therefore, the convenience for setting the multi-axis control apparatus is greatly improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for setting identification codes of smart motors, adapted to set identification codes for a plurality of smart motors, the method for setting identification codes of the smart motors comprising:
    entering an identification code setting mode when the smart motors receive an identification code setting command;
    detecting a shaft rotation angle of each of the smart motors under the identification code setting mode, so as to determine whether the shaft rotation angle of each of the smart motors is larger than a setting value; and
    setting an identification code of one of the smart motors from a preset identification code to a first identification code when the one of the smart motors determines that the shaft rotation angle thereof is larger than the setting value.

2. The method for setting identification codes of the smart motors as claimed in claim 1, further comprising:
    sending a setting indication signal comprising the first identification code by the one of the smart motors;
    broadcasting the setting indication signal to the other smart motors through a bus; and
    recording the first identification code occupied by the one of the smart motors when the other smart motors receive the setting indication signal.

3. The method for setting identification codes of the smart motors as claimed in claim 2, further comprising:
    setting an identification code of another one of the smart motors to a second identification code that is not occupied when the another one of the smart motors determines that the shaft rotation angle thereof is larger than the setting value.

4. The method for setting identification codes of the smart motors as claimed in claim 3, wherein the step of setting the identification code of the another one of the smart motors to the second identification code that is not occupied comprises:
    setting the identification code of the another one of the smart motors from the preset identification code to the first identification code according to the setting indication signal; and
    setting the identification code of the another one of the smart motors from the first identification code to the second identification code when the another one of the smart motors determines that the shaft rotation angle thereof is larger than the setting value, wherein the second identification code is the first identification code plus a unit preset value.

5. The method for setting identification codes of the smart motors as claimed in claim 1, further comprising:
resetting the identification code of each of the smart motors to the preset identification code when the smart motors enter the identification code setting mode.

6. A multi-axis control apparatus, comprising:
a plurality of smart motors, respectively having a preset identification code; and
a main controller, configured to provide a plurality of control commands to respectively control rotation of the smart motors, wherein the main controller is configured to send an identification code setting command to set identification codes of the smart motors, and the smart motors enter an identification code setting mode after receiving the identification code setting command,
wherein the smart motors respectively detect a shaft rotation angle thereof under the identification code setting mode, and respectively determine whether the respective shaft rotation angle is larger than a setting value,
wherein when one of the smart motors determines that the shaft rotation angle thereof is larger than the setting value, the one of the smart motors sets an identification code thereof from a preset identification code to a first identification code.

7. The multi-axis control apparatus as claimed in claim 6, further comprising:
a bus, coupled to the smart motors and the main controller, and serving as a communication interface between the smart motors and between the smart motors and the main controller.

8. The multi-axis control apparatus as claimed in claim 7, wherein under the identification setting mode, the one of the smart motors sends a setting indication signal comprising the first identification code, and broadcasts the setting indication signal to the other smart motors through the bus, and the other smart motors record the first identification code occupied by the one of the smart motors according to the received setting indication signal.

9. The multi-axis control apparatus as claimed in claim 8, wherein when another one of the smart motors determines that the shaft rotation angle thereof is larger than the setting value, the another one of the smart motors sets an identification code thereof to a second identification code that is not occupied.

10. The multi-axis control apparatus as claimed in claim 9, wherein when the another one of the smart motors receives the setting indication signal, the another one of the smart motors sets an identification code thereof from the preset identification code to the first identification code according to the setting indication signal, and when the another one of the smart motors determines that the shaft rotation angle thereof is larger than the setting value, the another one of the smart motors sets the identification code thereof from the first identification code to the second identification code, wherein the second identification code is the first identification code plus a unit preset value.

11. The multi-axis control apparatus as claimed in claim 7, wherein the bus comprises:
a power line, coupled to the main controller and a power port of each of the smart motors;
a ground line, coupled to the main controller and a ground port of each of the smart motors; and
a signal line, coupled to the main controller and a data transmitting port of each of the smart motors,
wherein when each of the smart motors transmits a signal to each other, each of the smart motors sends the signal to the other smart motors through the signal line in a broadcasting manner.

12. The multi-axis control apparatus as claimed in claim 8, wherein the position sensor comprises:
a variable resistor, having a first terminal coupled to a reference voltage, a second terminal coupled to a ground port, and an adjusting terminal coupled to the shaft, wherein an equivalent resistance value of the variable resistor is varied along with the rotation of the shaft; and
a voltage detection unit, coupled to the variable resistor, and configured to detect a voltage value between the first terminal and the adjusting terminal of the variable resistor, and taking the detected voltage value as the shaft detection signal for providing to the motor controller.

13. The multi-axis control apparatus as claimed in claim 7, wherein the bus comprises:
a power line, coupled to the main controller and a power port of each of the smart motors;
a ground line, coupled to the main controller and a ground port of each of the smart motors;
a signal receiving line, coupled to a data transmitting port of the main controller and a signal receiving port of each of the smart motors; and
a signal transmitting line, coupled to a data receiving port of the main controller and a signal transmitting port of each of the smart motors,
wherein when each of the smart motors transmits a signal to each other, each of the smart motors sends the signal to the main controller through the signal transmitting line, and the controller transmits the signal to the other smart motors through the signal receiving line in a broadcasting manner.

14. The multi-axis control apparatus as claimed in claim 6, wherein each of the smart motors comprises:
a gear set;
a motor body, having a shaft, wherein the shaft is coupled to the gear set to drive the gear set to rotate;
a position sensor, coupled to the gear set and the motor body, and configured to detect a rotation angle of the gear set to generate a shaft detection signal; and
a motor controller, coupled to the motor body and the position sensor, and configured to communicate with the main controller to control an operation of the motor body, wherein the motor controller further calculates the shaft rotation angle according to the shaft detection signal.

* * * * *